United States Patent [19]
Mendes

[11] Patent Number: 5,333,409
[45] Date of Patent: Aug. 2, 1994

[54] HANGING POT FOR GROWING PLANTS

[76] Inventor: Frank P. Mendes, 905 N. Main Rd., P.O. Box 678, Jamestown, R.I. 02835

[21] Appl. No.: 990,431

[22] Filed: Dec. 15, 1992

[51] Int. Cl.$^5$ .............................................. A01G 9/02
[52] U.S. Cl. ............................................ 47/67; 47/83
[58] Field of Search ........................... 47/67, 82, 83

[56] References Cited

U.S. PATENT DOCUMENTS

| | | | |
|---|---|---|---|
| D. 262,274 | 12/1981 | Lahr | 47/82 |
| 262,335 | 8/1882 | Wagner | 47/83 |
| 4,034,508 | 7/1977 | Dedolph . | |
| 4,268,994 | 5/1981 | Urai . | |
| 4,389,813 | 6/1983 | Jaques | 47/67 |
| 4,454,684 | 6/1984 | O'Hare . | |
| 4,622,777 | 11/1986 | Greene | 47/67 |
| 4,986,027 | 1/1991 | Harvey . | |

FOREIGN PATENT DOCUMENTS

| | | | |
|---|---|---|---|
| 98474 | 1/1984 | European Pat. Off. | 47/82 |
| 3407696 | 5/1985 | Fed. Rep. of Germany | 41/67 |
| 2222063 | 2/1990 | United Kingdom | 47/83 |
| 7266 | 7/1990 | World Int. Prop. O. | 47/83 |

Primary Examiner—Henry E. Raduazo
Attorney, Agent, or Firm—Salter & Michaelson

[57] ABSTRACT

A hanging pot is provided with a plurality of tubular inserts which extend through the outer wall of the pot. The root portion of the growing plants are planted within the pot and the stalks of growing plants are extended through the tubular inserts so that they hang downwardly from the pot. The tubular inserts surround the stalks or stems of the plants and protect them from breaking under their own weight as they hang downwardly.

7 Claims, 1 Drawing Sheet

HANGING POT FOR GROWING PLANTS

BACKGROUND OF THE INVENTION

The instant invention relates to devices for cultivating plants and more particularly to a hanging pot for growing plants and vegetables.

It has been found that many people in urban areas have very little land space which can be utilized for gardening or cultivating vegetables. Accordingly, it has been found that there is a need for alternative methods for cultivating plants and vegetables which do not occupy a significant amount of land space.

Prior to the instant invention some efforts have been made to provide cultivation devices that enable plants and vegetables to be cultivated in minimal size soil enclosures, and vertically oriented soil enclosures. For example, the U.S. Pat. No. to Urai 4,268,994; Harvey No. 4,986,027; O'Hare No. 4,454,684 and Dedolph No. 4,034,508 are representative of such devices. The patent to Urai discloses a three-dimensional planter comprising a vertically disposed cultivation body and a liquid reservoir which supplies the cultivation body with liquid. The patent to Harvey discloses a hydroponic growth system comprising a vertically disposed column having slits in the outer wall thereof and a root permeable material therein. The column rests in a reservoir of liquid nutrients and a pump supplies the liquid nutrients to the column. The patent to O'Hare also discloses a hydroponic planter device having a vertically disposed growing column. The patent to Dedolph discloses a soil planter and means for creating polymerized soil plugs.

SUMMARY OF THE INVENTION

The instant invention provides a hanging pot for growing plants or vegetables.

Briefly, the hanging pot comprises a cultivating pot having a bottom wall and an outer wall, a plurality of circumferentially spaced apertures in the outer wall, corresponding segments of plastic tubing mounted in the apertures, and wire hangers for suspending the pot from an overhead structure. The tubing segments are extended through the apertures so that a portion of the tubing extends inwardly into the pot, and a portion extends outwardly of the pot. In use, the pot is filled with potting soil to the bottom of the tubing segments, and the root portion of plants are then inserted through the tubing segments so that the root portions are positioned inside the pot, and the stalk or stem portions extend through the tubing segments outwardly of the pot. Once the plants are properly positioned, the pot is filled with potting soil to cover the roots. As the plants grow, the stalks will hang downwardly from the pot wherein the tubing segments will support and protect the stalks so that they do not break under their own weight.

Accordingly, it is an object of the instant invention to provide a hanging pot.

It is another object to provide a hanging pot which is adapted for allowing the plants to hang downwardly through apertures in the outer wall of the pot.

It is still another object to provide tubing segments mounted in the outer wall of the pot for supporting the stalks or stems of the plants and preventing them from breaking under there own weight.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention;

FIG. 3 is a cross-section view thereof taken along line 3—3 of FIG. 1.

DESCRIPTION OF THE PREFERRED EMBODIMENT

Figure 1:
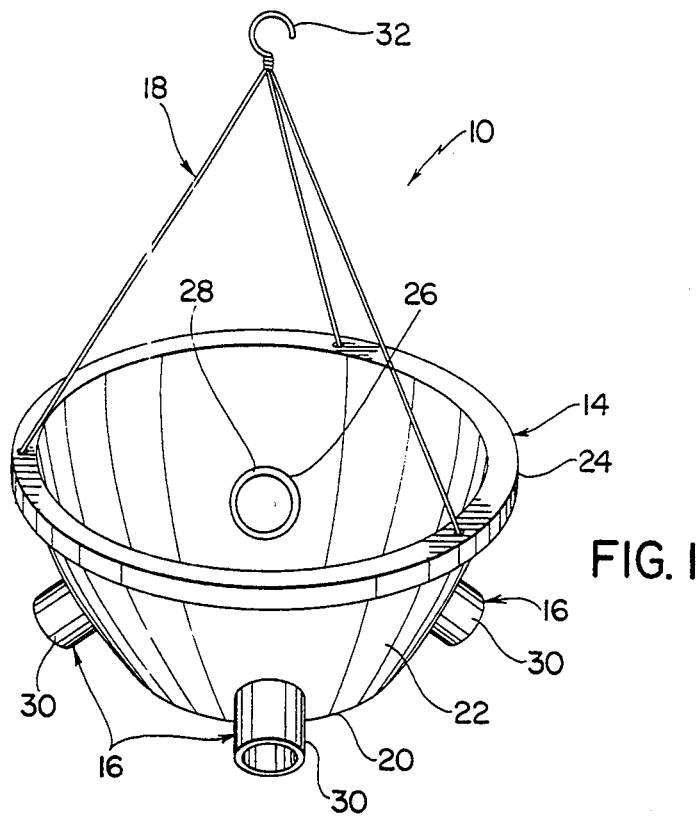
FIG. 1 is a perspective view of the hanging pot of the instant invention.
Figure 2:
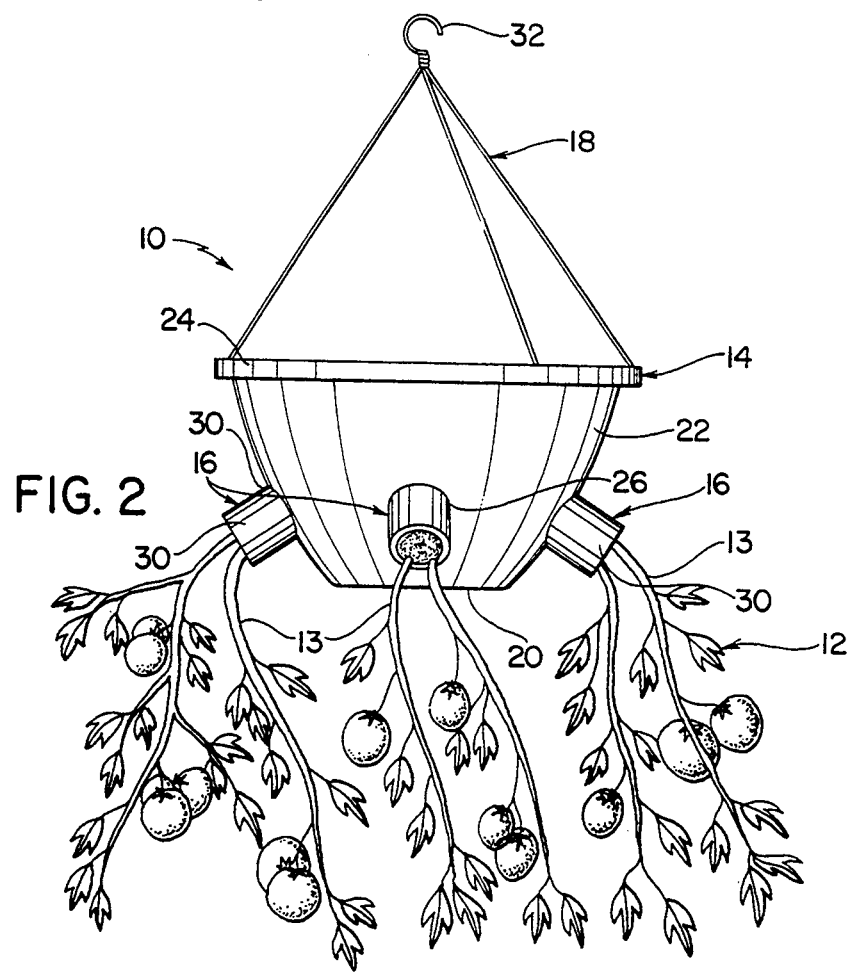
FIG. 2 is an elevational view thereof with a plurality of tomato plants growing therein.

Referring now to the drawings, the hanging pot of the instant invention is illustrated and is generally indicated at 10 in FIGS. 1 through 3. As will be more fully described hereinafter, the hanging pot 10 is effective for growing plants generally indicated at 12, especially vegetable plants, in a limited space, wherein the stalks or stems 13 of the plants 12 hang downwardly from the pot 10.

The hanging pot 10 comprises a generally circular cultivating pot generally indicated at 14 which is preferably fashioned from a rigid, durable plastic material, a plurality of tubing segments generally indicated at 16, and a plurality of wire hangers generally indicated at 18 for suspending the cultivating pot 14 from an overhead structure. The cultivating pot 14 includes a flat bottom wall 20, an outer wall 22 having a rim 24 at the upper edge thereof, and a plurality of circumferentially spaced apertures 26 in the outer wall 22. The cultivating pot 14 preferably measures twelve inches in diameter at the rim 24 of the outer wall 22, although any convenient size pot can be utilized. The apertures 26 are approximately one inch in diameter and are spaced approximately one inch from the bottom 20 of the cultivating pot 14. The tubing segments 16 preferably comprise segments of plastic tubing which are approximately two inches in length. The plastic tubing segments 16 are extended through the apertures 26 so that a first portion 28 of the tubing segments 16 extends inwardly into the interior of the cultivating pot 14 (see FIG. 3) and a second portion 30 extends outwardly of the cultivating pot 14. The plastic tubing segments 16 are then secured to the outer wall 22 by any suitable means, such as by plastic cement or other suitable epoxy resin. The wire hangers 18 are well known and are used in the conventional manner. The first ends of the wire hangers 18 are secured to the rim 24 of the cultivating pot 14 and the second ends are formed into a U-shaped hook 32.

In use, the cultivating pot 14 is filled with potting soil up to the bottom of the tubing segments 16. The root portions of the plants 12 to be cultivated are washed under running water to remove the dirt surrounding the roots and the root portions are then inserted through the tubing segments 16 so that the root portions are positioned inside the pot, and the stalks or stems 13 of the plants 12 extend outwardly of the cultivating pot 14 through the tubing segments 16. When all of the plants 12 have been properly positioned, the cultivating pot 14 is filled with potting soil to approximately one inch from the rim 24. The hanging pot 10 may then be suspended from any overhead structure which is capable of supporting the weight of the pot 10 and the plants 12 as located therein. As the plants 12 grow, the stalks 13 will hang downwardly from the tubing segments 16 that are secured to the pot 10, wherein the tubing segments 16 function to support and protect the stalks 13 of plants 12 from breaking under their own weight.

It is seen therefore that the instant invention provides an effective hanging pot 10 for cultivating plants 12, especially vegetable plants. The plants 12 are positioned in the pot so that the stems 13 hang downwardly from the cultivating pot 14 and the tubing segments 16 are operable for protecting the stems from breaking under their own weigh as the plants 12 grow in size. For these reasons, the hanging pot 10 of the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hanging pot for growing plants comprising:
   a cultivating pot having an outer wall;
   a plurality of spaced apertures formed in said outer wall;
   a plurality of tubing segments mounted in said apertures, each of said tubing segments having a first portion projecting inwardly into said pot beyond the inner surface thereof and a second portion projecting outwardly of said pot; said second portion of said tubing segments also extending downwardly from said pot;
   means for hanging said pot from an overhead structure,
   said plants including a root portion and a stalk portion, said root portion being located within said pot, and said stalk portion extending outwardly of said pot through one of said tubular inserts so as to hang downwardly from said pot.

2. In the hanging pot of claim 1, said outer wall having a bottom edge, said apertures being spaced approximately one inch above said bottom edge.

3. In the hanging pot of claim 1, said means for hanging comprising wire hangers.

4. In the hanging pot of claim 1, said cultivating pot having a generally circular cross sectional configuration, said plurality of apertures being circumferentially spaced around said outer wall.

5. A hanging pot for growing plants comprising:
   a cultivating pot having an outer wall;
   a plurality of spaced apertures formed in said outer wall;
   a plurality of tubing segments mounted in said apertures, each of said tubing segments having a first portion projecting inwardly into said pot beyond the inner surface thereof and a second portion projecting outwardly of said pot; said first portion of said tubing segments also extending upwardly into said pot;
   means for hanging said pot from an overhead structure,
   said plants including a root portion and a stalk portion, said root portion being located within said pot, and said stalk portion extending outwardly of said pot through one of said tubular inserts so as to hang downwardly from said pot.

6. A hanging pot for cultivating plants, especially vegetable plants, comprising:
   a cultivating pot having a bottom, an outer wall, and a rim at an upper edge of the outer wall;
   a plurality of spaced apertures in said outer wall;
   a plurality of tubing segments mounted in said apertures, each of said tubing segments having a first portion projecting inwardly into said pot beyond the inner surface thereof, and a second portion projecting outwardly from said pot; said second portion of said tubing segments also extending downwardly from said pot;
   a plurality of wire hangers, each having a first end attached to the rim of said cultivating pot and a second free end, the second ends of said wire hangers being formed into a hook member for suspending said cultivating port from an overhead structure,
   said plants including a root portion and a stalk portion, said root portion being located within said cultivating pot, and said stalk portion extending outwardly of said cultivating pot through one of said tubing segments so as to hang downwardly from said cultivating pot.

7. A hanging pot for cultivating plants, especially vegetable plants, comprising:
   a cultivating pot having a bottom, an outer wall, and a rim at an upper edge of the outer wall;
   a plurality of spaced apertures in said outer wall;
   a plurality of tubing segments mounted in said apertures, each of said tubing segments having a first portion projecting inwardly into said pot beyond the inner surface thereof, and a second portion projecting outwardly from said pot; said first portion of said tubing segments also extending upwardly into said pot;
   a plurality of wire hangers, each having a first end attached to the rim of said cultivating pot and a second free end, the second ends of said wire hangers being formed into a hook member for suspending said cultivating port from an overhead structure,
   said plants including a root portion and a stalk portion, said root portion being located within said cultivating pot, and said stalk portion extending outwardly of said cultivating pot through one of said tubing segments so as to hang downwardly from said cultivating pot.

* * * * *